(12) United States Patent
Tai

(10) Patent No.: US 10,882,008 B2
(45) Date of Patent: Jan. 5, 2021

(54) APPARATUS FOR PROCESSING BIOLOGICAL SAMPLE

(71) Applicant: TAIGEN BIOSCIENCE CORPORATION, Taipei (TW)

(72) Inventor: Chi-Sheng Tai, Taipei (TW)

(73) Assignee: TAIGEN BIOSCIENCE CORPORATION, Taipei (TW)

( * ) Notice: Subject to any disclaimer, the term of this patent is extended or adjusted under 35 U.S.C. 154(b) by 254 days.

(21) Appl. No.: 15/887,917

(22) Filed: Feb. 2, 2018

(65) Prior Publication Data

US 2019/0070563 A1    Mar. 7, 2019

(30) Foreign Application Priority Data

Sep. 6, 2017    (TW) .............................. 106130509 A

(51) Int. Cl.
*B01D 63/06*    (2006.01)
*G01N 1/34*    (2006.01)
(Continued)

(52) U.S. Cl.
CPC ........ *B01D 63/062* (2013.01); *B01L 3/50255* (2013.01); *G01N 1/34* (2013.01);
(Continued)

(58) Field of Classification Search
CPC ... B01D 63/062; B01D 11/04; B01L 3/50255; B01L 3/00; B01L 3/50853;
(Continued)

(56) References Cited

U.S. PATENT DOCUMENTS

2003/0035759 A1*    2/2003    Coyne ................... B01L 3/5025
                                                                                  422/63
2006/0177354 A1*    8/2006    Daf ...................... B01L 3/50255
                                                                                  422/400
(Continued)

FOREIGN PATENT DOCUMENTS

CN    103201037 A    7/2013
EP    3128331 A1    2/2017
(Continued)

*Primary Examiner* — Benjamin R Whatley
*Assistant Examiner* — Curtis A Thompson
(74) *Attorney, Agent, or Firm* — Cheng-Ju Chiang

(57) ABSTRACT

An apparatus for processing biological sample is provided, which comprises a semi-permeable membrane column, an adaptor column and a vacuum manifold. The at least one semi-permeable membrane column is configured for accommodating biological sample therein and comprises a curved surface. The at least one adaptor column is configured for accommodating the semi-permeable membrane column therein and comprises a stopping element. The vacuum manifold is configured for creating a vacuum that facilitates flowing of the biological sample into the semi-permeable membrane column through a semi-permeable membrane therein. The stopping element abuts against the curved surface. By disposing the stopping element within the adaptor column, the present disclosure prevents the biological sample from suffering an unbalance pressure to splash upwardly outside the semi-permeable membrane column thereby causing a possibility of decreasing the testing efficiency, when the semi-permeable membrane column is removed out of the adaptor column.

8 Claims, 3 Drawing Sheets

(51) Int. Cl.
*G01N 1/40* (2006.01)
*B01L 3/00* (2006.01)
*B01D 11/04* (2006.01)
*F16L 25/00* (2006.01)
*G01N 35/00* (2006.01)
*G01N 1/31* (2006.01)

(52) U.S. Cl.
CPC ............ *G01N 1/4005* (2013.01); *B01D 11/04* (2013.01); *B01L 3/00* (2013.01); *B01L 3/50853* (2013.01); *B01L 2200/02* (2013.01); *B01L 2200/141* (2013.01); *B01L 2400/049* (2013.01); *F16L 25/00* (2013.01); *G01N 1/31* (2013.01); *G01N 1/40* (2013.01); *G01N 35/00* (2013.01)

(58) Field of Classification Search
CPC ......... B01L 2200/141; B01L 2400/049; B01L 2200/02; G01N 1/40; G01N 1/4005; G01N 1/34; G01N 1/31; G01N 35/00; G01N 1/28; F16L 25/00
See application file for complete search history.

(56) References Cited

U.S. PATENT DOCUMENTS

| | | | | |
|---|---|---|---|---|
| 2012/0294778 | A1* | 11/2012 | Daf | ......................... B01L 3/502 422/261 |
| 2013/0264286 | A1* | 10/2013 | Tai | ...................... B01L 3/50255 210/636 |
| 2014/0349410 | A1 | 11/2014 | Schaefer et al. | |

FOREIGN PATENT DOCUMENTS

| | | |
|---|---|---|
| JP | 2003-339374 A | 12/2003 |
| JP | 2012-254078 A | 12/2012 |
| JP | 2015-501424 A | 1/2015 |
| TW | I406712 B1 | 9/2013 |
| WO | 03/016863 A2 | 2/2003 |
| WO | 2012/134440 A1 | 10/2012 |
| WO | 2014/066215 A1 | 5/2014 |

\* cited by examiner

APPARATUS FOR PROCESSING BIOLOGICAL SAMPLE

FIELD OF THE INVENTION

The present invention relates to an apparatus for processing biological sample, and in particular, is related to an apparatus belongs to a field of biomedical industry, which is applied for automated equipments.

BACKGROUND OF THE INVENTION

Semi-permeable membrane columns are commonly used in biological laboratory for washing, separating, or purifying biological molecules, such as DNA, RNA, and proteins. Semi-permeable membrane columns that are commonly used are mostly cylindrical in shape, whereby the bottom is provided with one or more pieces of semi-permeable membranes for special purposes. The column is infused with liquid, and an adequate force is then applied to the liquid in the column, forcing the liquid out of the column through the semi-permeable membranes, to achieve its application purpose.

Normally, the applied force can be a centrifugal force or air pressure. When a centrifugal force is applied, the column is usually placed into a liquid collecting tube, and then the liquid is infused in the column. The liquid collecting tube and the column are then placed into rotor holes of a centrifuge. The centrifuge is turned on to spin at high speed to generate a high centrifugal force such that the liquid forcedly flows out of the column, through the semi-permeable membranes, into the liquid collecting tube. The above operating process is suitable only for a single column. When continuous operations involving numerous columns are required, the process would make the operator overly laboring. When air pressure is employed as an applied force, numerous semi-permeable membrane columns can be inserted into the same vacuum manifold, which comprises a greater capacity than a centrifuge. By applying a positive or negative air pressure, the liquid forcedly flows out of the columns, through the semi-permeable membranes, into the liquid collecting tube. This brings more conveniences for operating on numerous samples or continuous operations.

A conventional semi-permeable membrane column 31 (see FIG. 1) generally comprises three sections: an upper cervical section 311, a middle tubular section 312, and a lower tapered section 313. The diameter of the upper cervical section 311 is larger than that of the middle tubular section 312. Some of the columns include a cover 314. The middle tubular section 312 is provided for containing liquid sample, and its internal bottom part includes one or more specific purposed semi-permeable membranes (not shown in the figure). Some of the columns have a design of lower tapered sections 313.

As shown in FIG. 1, the engagement of the semi-permeable membrane column 31 with a vacuum manifold 32 is a tight insertion style, traditionally; that is, the lower tapered section 313 of the liquid semi-permeable membrane column 31 is inserted into a hole 34 of the vacuum manifold 32 directly or via an insertable adaptor column 33. The insertable adaptor column 33 is used to avoid direct insertion of the semi-permeable membrane column 31 into the hole 34 of the vacuum manifold 32, as the hole 34 of the vacuum manifold 32 may be frequently used in contact with the semi-permeable membrane columns where the different samples are contained, resulting in cross contamination occurring amongst different samples. The insertable adaptor column 33 can be of a disposable type or can be easily cleaned for repeated use. When the insertable adaptor column 33 is used, the lower tapered section 313 of the semi-permeable membrane column 31 is inserted into the insertable adaptor column 33. Then this ensemble is inserted to the hole 34 of the vacuum manifold 32, and forms the following structure from top to bottom: the semi-permeable membrane column 31, the insertable adaptor column 33, and the vacuum manifold 32. Many applications utilize the insertable adaptor column 33, especially for experiments which require no cross contamination of the samples, such as using purified nuclear acid for PCR reaction. It is therefore very important that this engagement must be tightly secured to avoid any gas leakage. Often, an operator comprises to hand-hold the semi-permeable membrane column 31 and the insertable adaptor column 33 to ensure tight engagement. It is likely that the operator may experience discomfort at their fingers due to this maneuver. On the other hand, as can be better understood by referring to FIG. 1, the semi-permeable membrane column 31 remains protruding outwardly from the apparatus during operation, and it is inserted into the hole 34 merely at its tip. Thus, it can easily become disengaged from the hole 34 due to any unintentional collision.

With reference to a granted Taiwan patent No. 201247323 co-owned by the same applicant of the present invention, it effectively solved the technical problem of sealing between the insertable adaptor column 33 and the vacuum manifold 32. However, there is another technical problem in need of being solved is that in order to keep the air-tightness, the semi-permeable membrane column 31 and the insertable adaptor column 33 need to be inserted fairly tight; therefore, when the semi-permeable membrane column 31 is removed from the insertable adaptor column 33, the sample passing through the semi-permeable membranes of the semi-permeable membrane column 31 might be splashed upwardly and outside the semi-permeable membrane column 31, through a space between the inner space of the insertable adaptor column 33 and the outside of the semi-permeable membrane column 31, due to the unbalanced pressure. Then, errors on sequential detection are caused.

Hence, it is needed to provide an apparatus for processing biological sample, for solving the aforementioned technical problem.

SUMMARY OF THE INVENTION

In order to solve the aforementioned technical problems of the conventional art, the present invention disposes a stopping element within an adaptor column to prevent the samples from suffering unbalanced pressure to splash upwardly outside the semi-permeable membrane column, thereby causing errors on sequential detection.

In order to achieve the objective, the present invention provides an apparatus for processing biological sample, which comprises at least one semi-permeable membrane column, at least one adaptor column, and a vacuum manifold.

A first receiving space is defined in an inner portion of the semi-permeable membrane column. A bottom of the first receiving space comprises at least one semi-permeable membrane, a top portion of the semi-permeable membrane column comprises a first opening and a first protrusion protruding radially outward, and a bottom portion of the semi-permeable membrane column comprises a first outlet and a curved surface.

A second receiving space is defined in an inner portion of the adaptor column. A top portion of the adaptor column comprises a second opening and a second protrusion protruding radially outward, and a bottom portion of the adaptor column comprises a second outlet and a stopping element, a diameter of the second receiving space is slightly larger than an outer diameter of the first receiving space, and the stopping element is disposed inside the at least one adaptor column and leans against the curved surface.

The vacuum manifold comprises a base and a lip covering the base. A storing space is defined inside the base. The lid is formed with at least one slot and each bottom of the at least one slot comprises a through hole for connecting with the storing space of the base. A diameter of the slot is slightly larger than an outer diameter of the adapter column.

In one preferred embodiment, the at least one adaptor column is formed with an annular groove at a position corresponding to the stopping element. The stopping element that is an O-ring is inserted into the annular groove, an inner diameter of the stopping element is equal or slightly larger than an outer diameter of the semi-permeable membrane column such that when the storing space of the vacuum manifold is drawn for creating vacuum, an air flow passing between the curved surface and the stopping element is decreased.

In one preferred embodiment, the stopping element is a rib formed integrally with the adaptor column.

In order to achieve the objective, the present invention provides another apparatus for processing biological sample, which comprises at least one semi-permeable membrane column, at least one adaptor column, and a vacuum manifold.

A first receiving space is defined in an inner portion of the semi-permeable membrane column. The first receiving space is used for receiving a biological sample. A bottom of the first receiving space comprises at least one semi-permeable membrane, and a bottom portion of the semi-permeable membrane column comprises a first outlet and an outer surface. The outer surface has a minimum outermost diameter equal to an outer diameter of the first outlet but smaller than an inner diameter of the stopping element, and has a maximum outermost diameter equal to the outlet diameter of the at least one semi-permeable membrane column but larger than the inner diameter of the stopping element.

A second receiving space is defined in an inner portion of the adaptor column. A bottom portion of the adaptor column comprises a second outlet and a stopping element, a diameter of the second receiving space is slightly larger than an outer diameter of the first receiving space. The stopping element is disposed inside the at least one adaptor column and leans against an outer surface of the at least one semi-permeable membrane column.

The vacuum manifold is used for receiving the at least one semi-permeable membrane column and the at least one adaptor column therein, and for generating a pressure to make the biological sample pass through the at least one semi-permeable membrane.

In one preferred embodiment, the outer surface is a curved surface. The curved surface is a conic surface which has a minimum outermost diameter equal to an outer diameter of the first outlet but smaller than an inner diameter of the stopping element, and has a maximum outermost diameter equal to the outer diameter of the at least one semi-permeable membrane column but larger than the inner diameter of the stopping element.

In one preferred embodiment, the at least one adaptor column is formed with an annular groove at a position corresponding to the stopping element. The stopping element that is an O-ring is inserted into the annular groove. An inner diameter of the stopping element is equal or slightly larger than an outer diameter of the semi-permeable membrane column such that when a storing space of the vacuum manifold is drawn for creating vacuum, air flow passing between the curved surface and the stopping element is decreased.

In one preferred embodiment, the stopping element is a rib formed integrally with the adaptor column.

In one embodiment, a top portion of the semi-permeable membrane column comprises a first opening and a first protrusion protruding radially outward. A top portion of the adaptor column comprises a second opening and a second protrusion protruding radially outward. The vacuum manifold comprises a base and a lid covering the base. A storing space is defined inside the base. The lip is formed with at least one slot and each bottom of the at least one slot comprises a through hole for connecting with the storing space of the base. A diameter of the slot is slightly larger than an outer diameter of the adapter column.

Compared with the prior arts, the present invention provides a stopping element disposed within the adaptor column, so as to prevent the samples from suffering unbalanced pressure to splash upwardly outside the semi-permeable membrane column.

DESCRIPTION OF THE DIAGRAMS

DETAILED DESCRIPTION OF THE PREFERRED EMBODIMENTS

The following description of the embodiments is given by way of illustration with reference to the specific embodiments in which the invention may be practiced. The terms such as "up", "down", "front", "back", "left", "right", "inside", "outside", "side", etc., The direction of the diagram. Accordingly, the use of a directional term is used to describe and to understand the present invention and is not intended to limit the invention.

Figure 1:
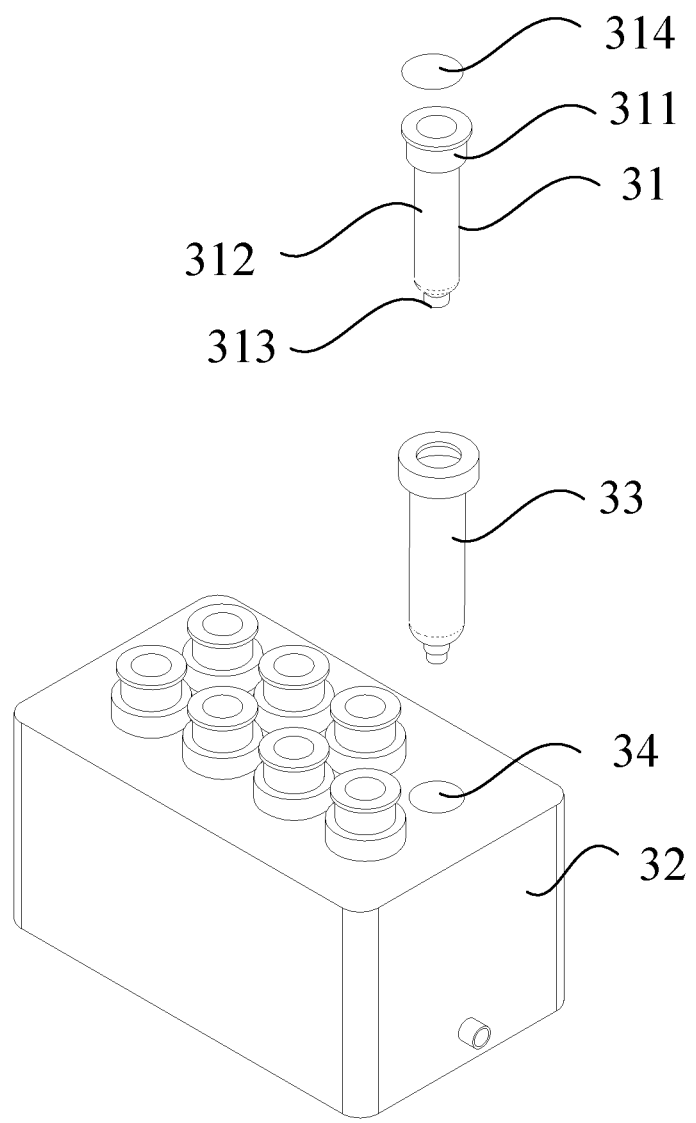
FIG. 1 is an illustrative diagram of a conventional apparatus for processing biological sample.
Figure 2:
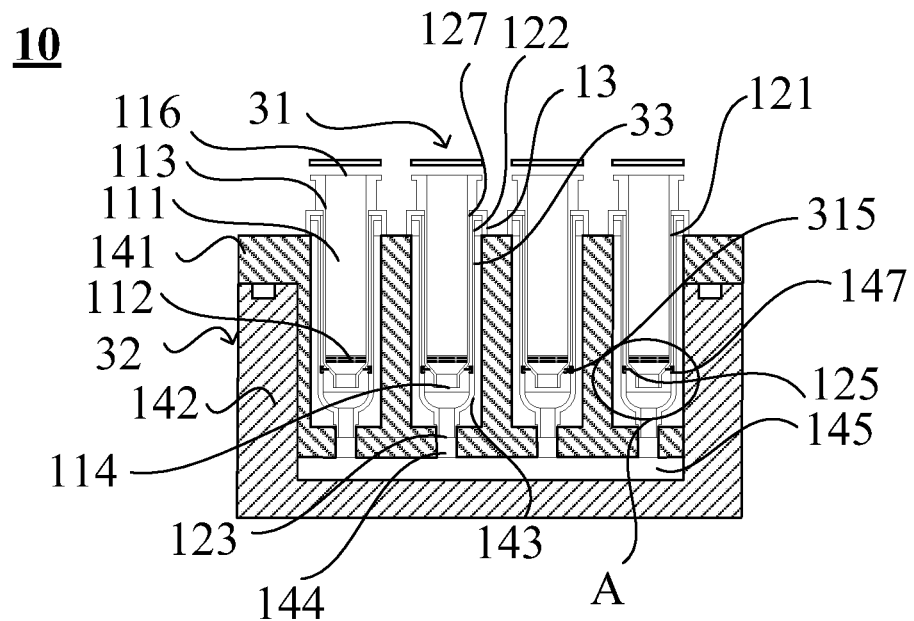
FIG. 2 is an illustrative diagram of an apparatus, for processing biological sample, of a first preferred embodiment according to the present invention.
Figure 3:
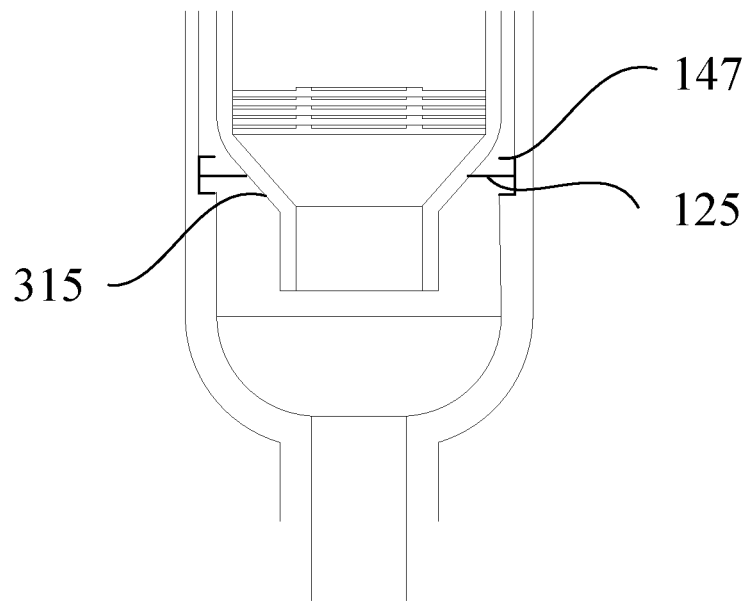
FIG. 3 is an enlarged diagram of the region A of FIG. 2.

Please refer to FIGS. 2-3. FIG. 2 is an illustrative diagram of an apparatus 10 for processing a biological sample of a first preferred embodiment according to the present invention. FIG. 3 is an enlarged diagram of the region A of FIG. 2. The apparatus 22 for processing biological sample comprises at least one semi-permeable membrane column 31, at least one adaptor column 33, and a vacuum manifold 32.

The semi-permeable membrane column 31 is a conventional one. The conventional semi-permeable membrane column 31 is generally cylindrical in shape, which comprises an inner portion, a top portion, and a bottom portion. A first receiving space 111 is defined in an inner portion of the semi-permeable membrane column 31. The first receiving space 111 is used for receiving a biological sample. The first receiving space 111 comprises at least one semi-permeable membrane 112. The top portion of the semi-permeable membrane column 31 comprises a first opening 116 and a first protrusion 113 protruding radially outward, and the bottom portion of the semi-permeable membrane column 116 comprises a first outlet 114 and a curved surface 315. In the preferred embodiment, the curved surface 315 is a conic surface but not limited thereto, however, it can be modified upon different demands.

The adopter column 33 is generally in a shape of a test tube, which can be made of any suitable material. The adopter column 33 comprises an inner portion, a top portion, and a bottom portion. A second receiving space 121 is defined in an inner portion of the adaptor column 33. The top portion of the adaptor column 33 comprises a second opening 127 and a second protrusion 122 protruding radially outward. The adaptor column 33 is formed with an annular groove 147 at a position corresponding to the stopping element 125. The stopping element 125 that is an O-ring is inserted into the annular groove 147, an inner diameter of the stopping element 125 is equal or slightly larger than an outer diameter of the semi-permeable membrane column 31 such that when a storing space 145 of a base 142 is drawn for creating vacuum, an air flow passing between the curved surface 315 and the stopping element 125 is decreased. A flexible airtight ring 13 is disposed around the second protrusion 122. A second outlet 123 formed on the bottom portion of the adapter column 33 is communicated with the first outlet 114, and a stopping element 125 is disposed on the bottom portion of the adapter column 33. An inner diameter of the adapter column 33 is slightly larger than an outer diameter of the middle portion of the semi-permeable membrane column 31, but smaller than a diameter of the top portion of the semi-permeable membrane column 31, so that the semi-permeable membrane column 31 can be inserted into the second receiving space 121 of the adapter column 33 in loose-fit connection, through the second opening 127 of the adapter column 33. The first protrusion 113 of the top portion of the semi-permeable membrane column 31 can lean against the flexible airtight ring 13. The flexible airtight ring 13 can be a flexible O-ring.

The vacuum manifold 32 comprises the base 142 and a lid 141 covering the base 142. A storing space 145 is defined inside the base 142. The lid 141 is formed with at least one slot 143 and a through hole 144. Each bottom of the at least one slot 143 comprises a through hole 144 for connecting with the storing space 145 of the base 142. A diameter of the slot 143 is slightly larger than an outer diameter of the adapter column 33.

When the semi-permeable membrane column 31 is inserted into the slot 143, the stopping element 125 can orientate the semi-permeable membrane column 31. Furthermore, when the storing space 145 of the vacuum manifold 32 is drawn for creating vacuum, air is hard to pass through an interface between the semi-permeable membrane column 31 and the stopping element 125, to ensure the atmospheric pressure forcing the liquid biological sample inside the semi-permeable membrane column 31 to pass through the permeable membrane, and thereby flowing outside the semi-permeable membrane column.

The advantage of the present invention is that: after the vacuum process is finished, and when separating the semi-permeable membrane column 31 from the adapter column 33, because the stopping element 125 leans against the curved surface 315, the biological sample can be prevented from suffering an unbalanced pressure to splash upwardly outside the semi-permeable membrane column.

Figure 4:
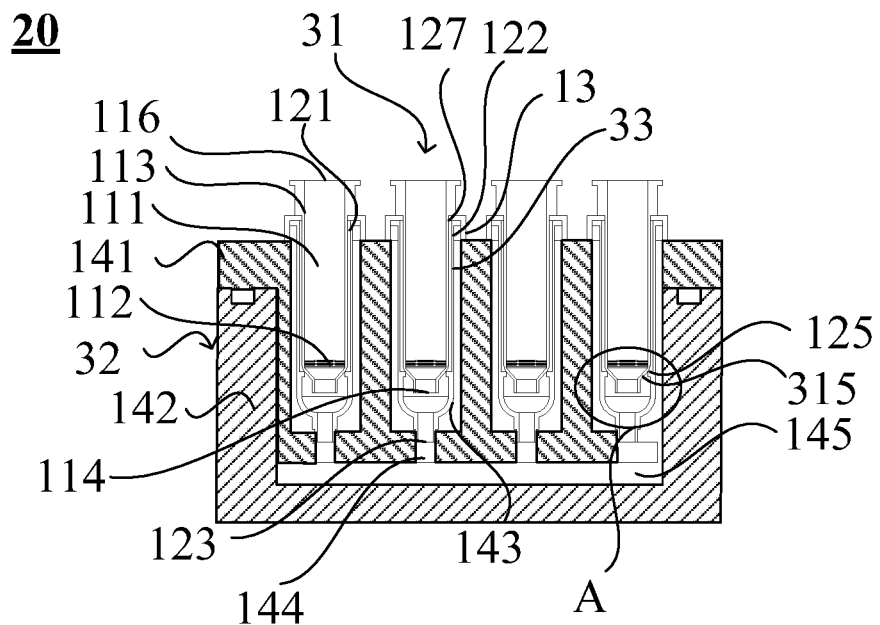
FIG. 4 is an illustrative diagram of an apparatus, for processing biological sample, of a second preferred embodiment according to the present invention.
Figure 5:
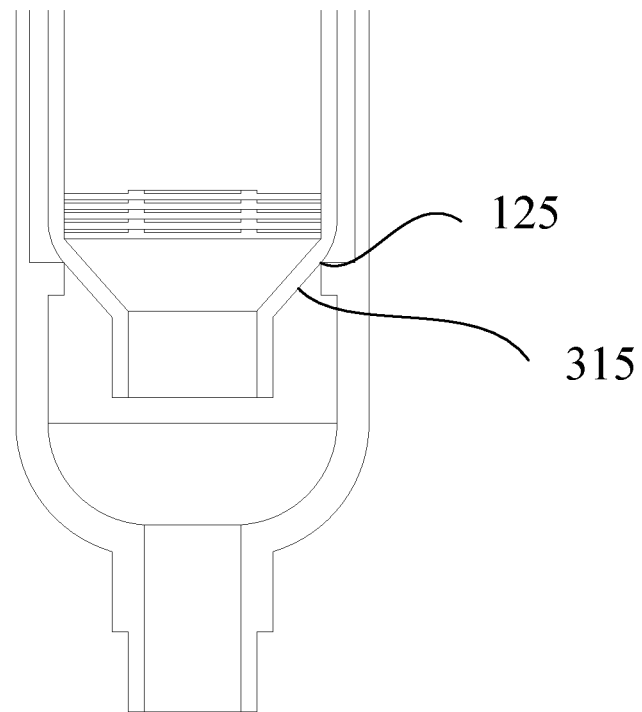
FIG. 5 is an enlarged diagram of the region A of FIG. 4.

Please refer to FIGS. 4-5. FIG. 4 is an illustrative diagram of an apparatus 20 for processing a biological sample of a second preferred embodiment according to the present invention. FIG. 5 is an enlarged diagram of the region A of FIG. 4. The differences between the second preferred embodiment and the first preferred embodiment are that: there is no requirement for disposing the annular groove 147. For replacement, the stopping element 125 is a rib disposed on the second receiving space 121 of the adapter column 33, the rib can be formed integrally with the adapter column 33, so as to further simplify the manufacturing process.

As described above, although the present invention comprises been described with the preferred embodiments thereof, those skilled in the art will appreciate that various modifications, additions, and substitutions are possible without departing from the scope and the spirit of the invention. Accordingly, the scope of the present invention is intended to be defined only by reference to the claims.

What is claimed is:

1. An apparatus for processing a biological sample, comprising:
    at least one semi-permeable membrane column wherein a first receiving space is defined in an inner portion of the semi-permeable membrane column, a bottom of the first receiving space comprises at least one semi-permeable membrane, a top portion of the semi-permeable membrane column comprises a first opening and a first protrusion protruding radially outward, and a bottom portion of the semi-permeable membrane column comprises a first outlet and a curved surface;
    at least one adaptor column wherein a second receiving space is defined in an inner portion of the adaptor column, a top portion of the adaptor column comprises a second opening and a second protrusion protruding radially outward, and a bottom portion of the adaptor column comprises a second outlet and a stopping element, a diameter of the second receiving space is slightly larger than an outer diameter of the first receiving space, and the stopping element is disposed inside the at least one adaptor column to cause the curved surface of the at least one semi-permeable membrane to lean against the stopping element inside the at least one adaptor column in a loose-fit connection; and
    a vacuum manifold, comprising a base and a lid covering the base, wherein a storing space is defined inside the base, the lid is formed with at least one slot and a bottom of the at least one slot comprises a through hole for connecting with the storing space of the base, and a diameter of the slot is slightly larger than an outer diameter of the adapter column, and the stopping element is contactless with a distal end of the first outlet
    wherein the curved surface is a conic surface which has a minimum outermost diameter equal to an outer diameter of the first outlet but smaller than an inner diameter of the stopping element, and has a maximum outermost diameter equal to the outer diameter of the at least one semi-permeable membrane column but larger than the inner diameter of the stopping element.

2. The apparatus for processing a biological sample according to claim 1, wherein the at least one adaptor column is formed with an annular groove at a position corresponding to the stopping element, the stopping element that is an O-ring is inserted into the annular groove such that when the storing space of the vacuum manifold is drawn for creating vacuum, an air flow passing between the curved surface and the stopping element is decreased.

3. The apparatus for processing a biological sample according to claim 1, wherein the stopping element is a rib formed integrally with the adaptor column.

4. An apparatus for processing a biological sample, comprising:
   at least one semi-permeable membrane column wherein a first receiving space is defined in an inner portion of the semi-permeable membrane column, the first receiving space is used for receiving a biological sample, a bottom of the first receiving space comprises at least one semi-permeable membrane, and a bottom portion of the semi-permeable membrane column comprises a first outlet and an outer surface;
   at least one adaptor column wherein a second receiving space is defined in an inner portion of the adaptor column, and a bottom portion of the adaptor column comprises a second outlet and a stopping element, a diameter of the second receiving space is slightly larger than an outer diameter of the first receiving space, the stopping element is disposed inside the at least one adaptor column to cause the outer surface of the at least one semi-permeable membrane to lean against the stopping element inside the at least one adaptor column in a loose-fit connection; and
   a vacuum manifold, for receiving the at least one semi-permeable membrane column and the at least one adaptor column therein, and for generating a pressure to make the biological sample pass through the at least one semi-permeable membrane, and the stopping element is contactless with a distal end of the first outlet
   wherein the outer surface has a minimum outermost diameter equal to an outer diameter of the first outlet but smaller than an inner diameter of the stopping element, and has a maximum outermost diameter equal to the outer diameter of the at least one semi-permeable membrane column but larger than the inner diameter of the stopping element.

5. The apparatus for processing a biological sample according to claim 4, wherein the outer surface is a curved surface.

6. The apparatus for processing a biological sample according to claim 4, wherein the at least one adaptor column is formed with an annular groove at a position corresponding to the stopping element, the stopping element that is an O-ring is inserted into the annular groove, such that when a storing space of the vacuum manifold is drawn for creating vacuum, an air low passing between the curved surface and the stopping element is decreased.

7. The apparatus for processing a biological sample according to claim 4, wherein the stopping element is a rib formed integrally with the adaptor column.

8. The apparatus for processing a biological sample according to claim 4, wherein a top portion of the semi-permeable membrane column comprises a first opening and a first protrusion protruding radially outward, a top portion of the adaptor column comprises a second opening and a second protrusion protruding radially outward, the vacuum manifold comprises a base and a lid covering the base, a storing space is defined inside the base, the lid is formed with at least one slot and each bottom of the at least one slot comprises a through hole for connecting with the storing space of the base, and an diameter of the slot is slightly larger than an outer diameter of the adapter column.

* * * * *